Jan. 20, 1925.  1,523,673
M. W. THOMAS ET AL
TROLLEY
Filed May 8, 1922   2 Sheets-Sheet 2
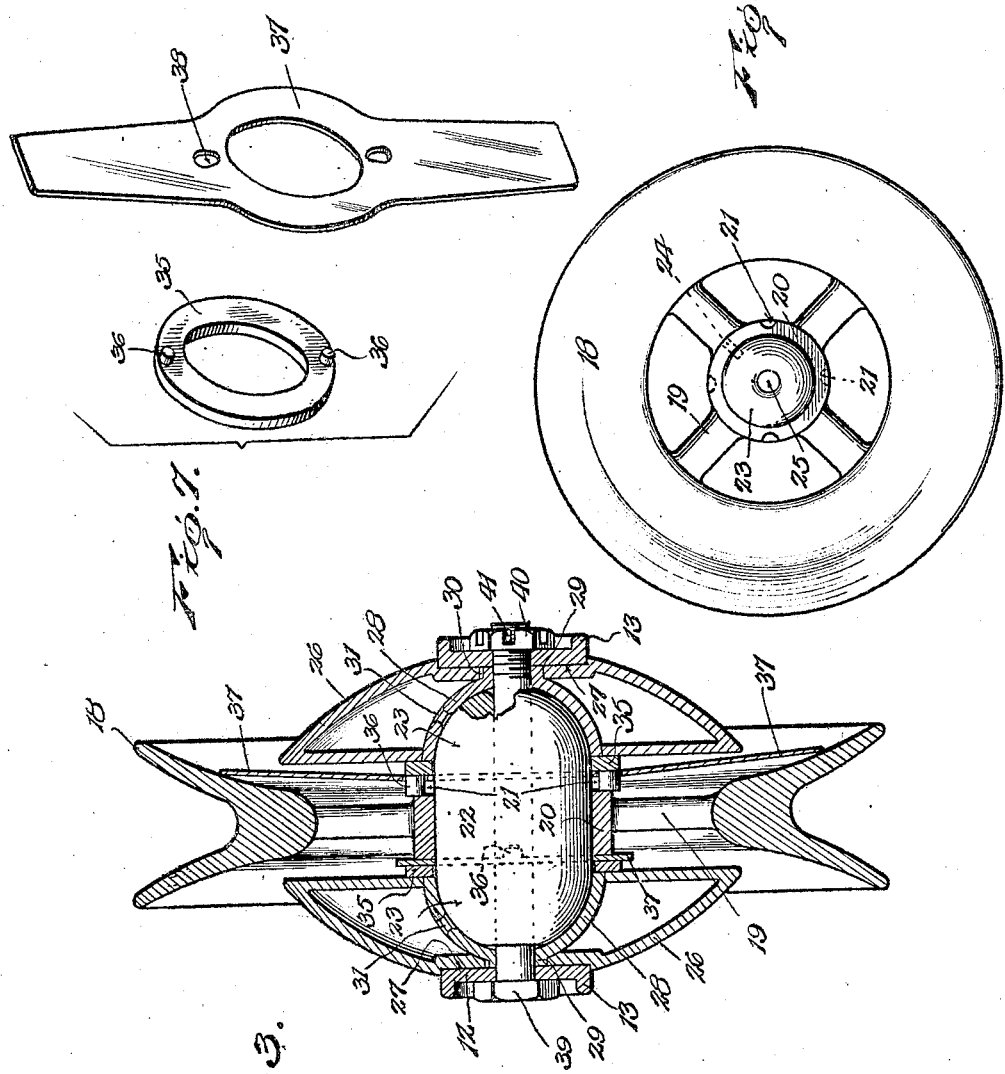
Inventors.
M. W. Thomas.
J. L. Fearing.
By Lacey & Lacey, Attorneys Patented Jan. 20, 1925.

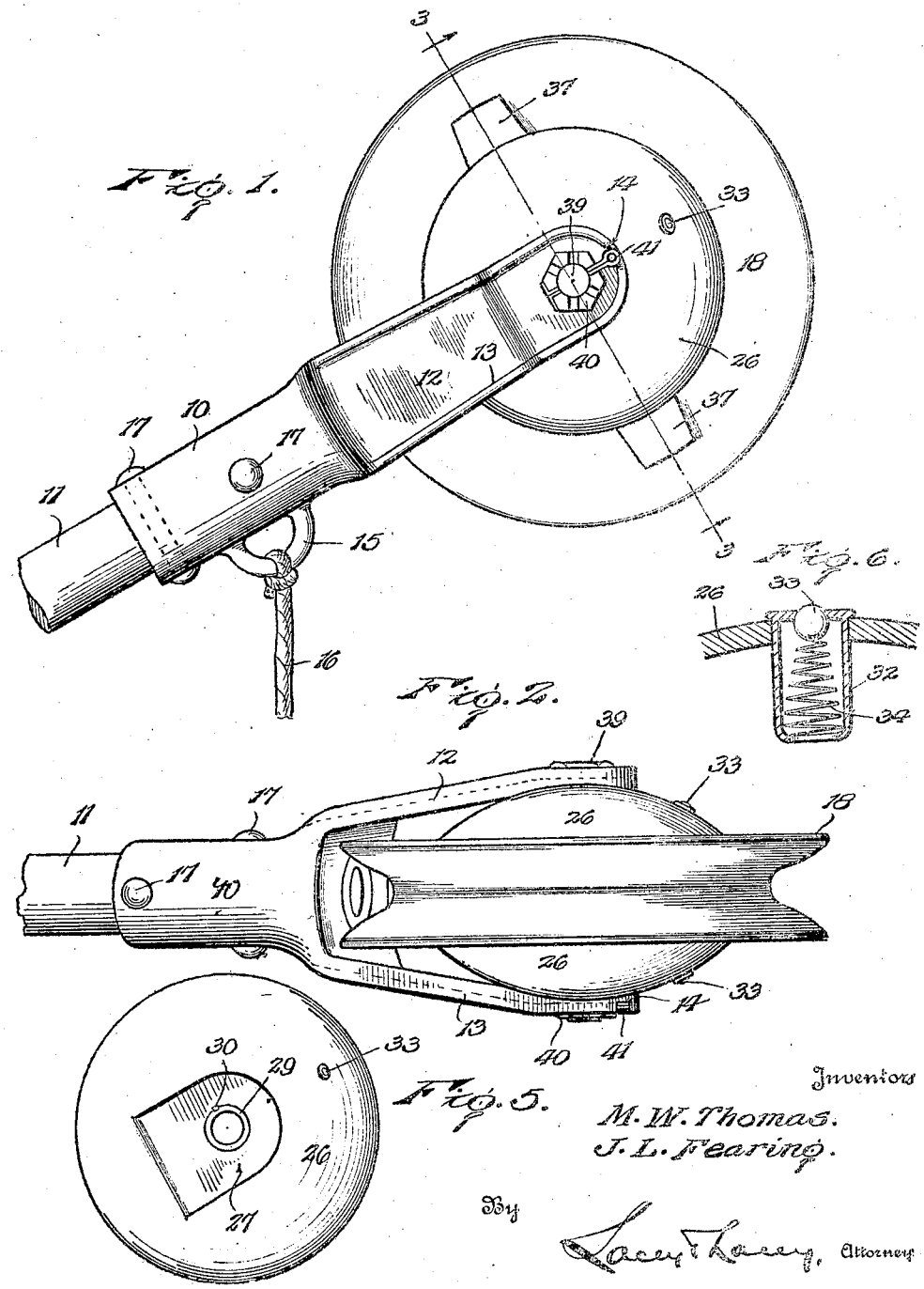

1,523,673

UNITED STATES PATENT OFFICE.

MITCHELL W. THOMAS AND JOHN L. FEARING, OF ASHLAND, KENTUCKY, ASSIGNORS TO THORNTON TROLLEY WHEEL CO., OF ASHLAND, KENTUCKY, A CORPORATION OF KENTUCKY.

TROLLEY.

Application filed May 8, 1922. Serial No. 559,236.

*To all whom it may concern:*

Be it known that we, MITCHELL W. THOMAS and JOHN L. FEARING, citizens of the United States, residing at Ashland, in the county of Boyd and State of Kentucky, have invented certain new and useful Improvements in Trolleys, of which the following is a specification.

This invention relates to an improved trolley and seeks, as one of its principal objects, to provide a device of this character employing grease reservoirs for the journals of the trolley wheel and wherein said reservoirs as well as the wheel may be readily removed from the trolley harp.

The invention has as a further object to provide a trolley wherein the grease reservoirs will carry end bearings for the axle of the trolley wheel and wherein said reservoirs will be formed as individual units so that the reservoirs may be displaced for renewing the bearings as occasion may demand.

A still further object of the invention is to provide a trolley wherein the grease reservoirs will be interchangeable so that when the bearings of the reservoirs have become worn at their lower sides, the trolley wheel with the reservoirs assembled thereon may be reversed side for side within the harp for disposing the unworn portions of the bearings to receive the stress.

The invention has as a further object to provide a trolley wherein wear upon the bearings may be readily taken up.

Another object of the invention is to provide a trolley wherein lubricant will be constantly fed from the reservoirs through the bearings carried thereby to the journals of the axle in such manner that the full effectiveness of the lubricant will be realized before the lubricant can escape from the bearings and wherein thrust washers will be provided to not only receive the wear between the hub of the wheel and the bearings of the reservoir but to also close such bearings so as to prevent loss or waste of the lubricant.

And the invention has as a still further object to provide a trolley embodying conductors for leading the current from the trolley wheel to the harp without passing through the journals of the wheel to thereby eliminate pitting of the journals and wherein said conductors will be in the nature of springs acting to press the thrust washers outwardly into engagement with the ends of the bearings of the reservoirs to maintain said bearings constantly closed.

Other and incidental objects will appear hereinafter.

In the drawings:

Figure 1 is a side elevation of our improved trolley wheel,

Figure 2 is an end view of the device,

Figure 3 is a sectional view on the line 3—3 of Figure 1, looking in the direction of the arrows, Figure 4 is a detail side elevation of the wheel, Figure 5 is a detail side elevation of one of the grease reservoirs of the device, Figure 6 is a detail section showing one of the closure valves of the grease reservoirs, and Figure 7 is a detail perspective view showing one of the conductor springs of the device as well as one of the thrust washers.

In carrying the invention into effect, we employ a harp embodying a sleeve 10 adapted to fit over a trolley pole, as conventionally illustrated at 11, and extending from the harp are diverging arms 12 provided with marginal upstanding reinforcing flanges 13 in one of which is formed a notch 14 at the outer end of the fork. The sleeve 10 is provided with an eye 15 to receive a trolley rope, as conventionally illustrated at 16, and extending through the sleeve and through the pole 11 are rivets or other suitable fastening devices 17 rigidly securing the harp upon the pole.

The trolley wheel is indicated at 18, this wheel being grooved in the usual manner to engage with a trolley wire and provided with spokes 19 supporting a hub 20 in each end of which is a pair of diametrically arranged notches 21. Tightly fitting through the hub is an axle 22 provided at its ends with conoidal journals 23 and connecting the axle to the hub to turn in unison therewith is a locking pin 24. The hub is provided with a central bore 25 therethrough and, as best shown in Figure 3, the ends of the journals 23 are provided with rounded edges at the ends of said bore so as to prevent chipping of the journals.

Assembled upon the axle 22 of the wheel are disc shaped grease reservoirs 26 having flat inner walls and spherical outer walls in which are formed, as best shown in Figure 5, seats 27 snugly receiving the outer ends of the fork 12 of the harp. In this connection it will be noted that said seats are formed with straight side walls to coact with the side edges of the fork so that the reservoirs will be rigidly locked against rotation. Mounted upon the reservoirs axially thereof are cup shaped bearings 28 pressed into suitable openings in the flat inner walls of the reservoirs to lie flush with said walls and provided at their outer ends with annular flanges 29 tightly fitting through suitable openings in the bottom walls of the seats 27. These bearings are formed to fit the conoidal journals 23 of the axle 22 and engaging the flanges 29 of said bearings are keys 30 locking the bearings against rotation. Formed through each of the bearings is a plurality of grease openings 31 disposed to constantly feed grease from the reservoirs into the bearings near the smaller ends thereof. Thus, the bearings will, since said bearings snugly fit the journals 23, tend to retain grease therein and, as will be noted, the grease will be required to travel the major length of the journals before reaching the open ends of the bearings. The full effectiveness of the grease will thus be realized. Preferably, the openings 31 are countersunk at opposite ends thereof so as to minimize the possibility of clogging of said openings. Snugly fitting through the outer curved walls of the reservoirs are filling valves therefor, each of which includes, as shown in detail in Figure 6, a casing 32 in which is mounted a ball valve 33 normally held closed by a spring 34 confined within the casing. Thus, the spout of a grease gun may be employed to press the valves 33 open, when the gun may be operated for filling the reservoirs with grease.

Surrounding the axle 22 at the ends of the hub 20 of the wheel 18 are thrust washers 35 lying flat against the open end edges of the bearings 28 and extending from said washers are, as shown in detail in Figure 7, pairs of laterally directed lugs 36 engaging in the notches 21 in the end of the hub 20 for locking the washers against rotation. Fitting over the ends of the axle to lie beneath said washers are conductor springs 37 which are of a length to engage at their ends with the side faces of the wheel, and formed in said springs are pairs of openings 38 accommodating the lugs 36 of the washers. Thus, the springs are also locked against rotation about the axle and, as will be noted, said springs are disposed at substantially right angles to each other, the pairs of notches 21 in the ends of the hub 20 being thus arranged. Accordingly, the springs will contact the side faces of the wheel at quadrantly spaced points so that current will, following the course of least resistance, pass through either one spring or the other to the washers 35 and thence through the reservoirs 26 to the forks of the harp. The necessity for the current to pass through the bearings 28 and the journals of the axle is thus eliminated so that pitting of said journals will be overcome. As brought out in Figure 3, the conductor springs are flexed longitudinally by the washers so that said springs will be held under tension pressing at their ends against the side faces of the wheel to provide efficient electrical contact therewith and also pressing outwardly against the washers for holding the washers in firm contact with the open end edges of the bearings 28. Constantly sealed joints between the washers and bearings will thus be had to prevent waste of grease from the bearings. Extending through the fork 12 of the harp, through the flanges 29 of the bearings, and through the bore 25 of the axle 22 of the wheel is a bolt 39 upon which is threaded a nut 40 notched to accommodate a cotter pin 41 extending through the bolt for locking the nut against accidental displacement. As shown in Figure 1, this cotter pin is received within the notch 14 in the flange of the adjacent arm of the harp so that the cotter pin will thus coact between said flange and the bolt for locking the bolt against rotation. Accordingly, the bolt will serve to hold the parts in assembled relation without functioning as an axle for the wheel and as wear upon the journals 23 and bearings 28 occurs the nut 40 on the bolt may be tightened for taking up such wear. Furthermore, as will be noted, the flanges 13 of the arms of the harp form guards for the head of the bolt and the nut thereon so that the trolley wheel will not easily catch against overhead equipment.

Attention is now directed to the fact that by removing the bolt 39, the wheel, with the grease reservoirs 26 assembled thereon, may be bodily removed from the harp and since the reservoirs are interchangeable the wheel and reservoirs may, when the bearings 28 become worn at their lower sides, be turned side for side within the harp so that the unworn portions of said bearings will be disposed beneath the journals of the wheel axle. The usefulness of the bearings may thus be greatly prolonged and, in this connection, it is to be noted that the filling valves for the reserviors are, as shown in Figure 1, disposed in alignment with the arms of the harp so that said valves will always be disposed at a predetermined elevation. Since the reservoirs may be freely detached from the harp along with the wheel, these reservoirs may be easily renewed at any time and, likewise, the thrust washers 35 may also be readily renewed. The device may accordingly be repaired with a minimum of difficulty.

Having thus described the invention, what is claimed as new is:

1. A trolley including a wheel having an axle provided with rounded ends, a harp straddling the wheel, freely removable reservoirs interposed between the harp and axle and being separate therefrom, the reservoirs being provided with outer side walls seating the harp and with inner side walls confronting the wheel, cup-shaped bearings extending through the reservoirs and fixed to the side walls thereof journaling the ends of said axle, and a fastening device extending through the harp, the bearings and said axle and constituting a sole fastening means securing the parts in assembled relation.

2. A trolley including a wheel having an axle provided with rounded ends, a harp straddling the wheel, freely removable reservoirs interposed between the harp and axle and being separate therefrom, the reservoirs being provided with outer side walls seating the harp and with inner side walls confronting the wheel, cup-shaped bearings extending through the reservoirs and fixed to the side walls thereof journaling the ends of said axle, and a fastening device extending through the harp, the bearings and said axle and constituting a sole fastening means securing the parts in assembled relation, said fastening device being adjustable for taking up wear on the bearings.

3. A trolley including a wheel having an axle provided with rounded ends, freely removable reservoirs flanking the wheel at opposite sides thereof and provided with inner and outer side walls, the outer side walls of the reservoirs being formed with seats, a harp having a fork engaging in said seats locking the reservoirs against rotation, cup-shaped bearings extending through the reservoirs and fixed to the side walls thereof journaling the ends of said axle, and a fastening device extending through the harp, the bearings and said axle and constituting a sole fastening means securing the parts in assembled relation.

4. A trolley including a wheel having an axle provided with rounded ends, a harp straddling the wheel, freely removable reservoirs interposed between the harp and axle and being separate therefrom, the reservoirs being formed with outer side walls seating the harp and with inner side walls confronting the wheel, cup-shaped bearings extending through the reservoirs and fixed to the side walls thereof journaling the ends of said axle, said bearings having their larger ends lying substantially flush with said inner side walls and provided at their smaller ends with flanges extending through said outer side walls, and a fastening device extending through the harp and axle fitting through said flanges and constituting a sole fastening means securing the parts in assembled relation.

5. A trolley including a wheel having an axle provided with rounded ends, freely removable disc-shaped reservoirs flanking the wheel at opposite sides thereof and provided with flat inner side walls confronting the wheel and with spherical outer side walls having seats therein, a harp having a fork engaging in said seats locking the reservoirs against rotation, cup-shaped bearings extending through the reservoirs and fixed to the walls thereof journaling the ends of said axle, the bearings being provided at their outer ends with flanges extending through the bottom walls of said seats, and a fastening device extending through the harp, the bearings and said axle fitting through said flanges and constituting a sole fastening means securing the parts in assembled relation.

6. A trolley including a harp having fork arms one provided with an upstanding flange having a notch therein, freely removable individual reservoirs mounted upon said fork arms but being separate therefrom, a wheel lying between the reservoirs and journaled thereon, a bolt extending through the fork arms connecting the wheel therewith and constituting the sole fastening medium holding the reservoirs and wheel in assembled relation, a nut threaded upon said bolt, and means locking the nut against counter-rotation and engaging in said notch locking the bolt against turning movement.

7. A trolley including a wheel having an axle, a harp straddling the wheel, reservoirs interposed between the harp and axle and being free with respect thereto, said reservoirs having bearings open at their confronting ends to receive and journal the axle, washers surrounding the axle overlying the open end edges of said bearings, yieldable means pressing the washers outwardly against the bearings, and means extending through the harp and axle connecting the reservoirs with the harp and securing the parts in assembled relation.

8. A trolley including a wheel having an axle, a harp straddling the wheel, reservoirs interposed between the harp and axle and being free with respect thereto, said reservoirs having bearings open at their confronting ends to receive and journal said axle, washers surrounding the axle overlying the open end edges of said bearings, flat springs held under tension between the wheel and said washers pressing the washers outwardly against said bearings, and means extending through the harp and axle connecting the reservoirs with the harp and securing the parts in assembled relation.

9. A trolley including a wheel having an axle, a harp straddling the wheel, reservoirs interposed between the harp and axle and being free with respect thereto, said reservoirs having bearings open at their confronting ends to receive and journal said axle, washers surrounding the axle overlying the open end edges of said bearings, springs coacting between the wheel and said washers pressing the washers outwardly against the bearings, means locking the washers against rotation, and means extending through the harp and axle connecting the reservoirs with the harp and securing the parts in assembled relation.

10. A trolley including a wheel having an axle, a harp straddling the wheel, reservoirs interposed between the harp and axle and being free with respect thereto, said reservoirs having bearings open at their confronting ends to receive and journal said axle, washers surrounding the axle overlying the open end edges of said bearings, springs coacting between the wheel and said washers pressing the washers outwardly against the bearings, means coacting between the washers and the wheel locking the washers against rotation and engaging said springs for locking the springs against turning movement about the axle, and means extending through the harp and axle connecting the reservoirs with the axle and securing the parts in assembled relation.

11. A trolley including a wheel having an axle, a harp straddling the wheel, reservoirs interposed between the harp and axle and being free with respect thereto, said reservoirs having bearings open at their confronting ends to receive and journal said axle, washers surrounding the axle overlying the open end edges of said bearings, springs coacting between the wheel and said washers pressing the washers outwardly against the bearings, the wheel being provided with a hub having notches therein, lugs extending from said washers through the springs to engage in said notches locking the washers against rotation as well as also locking the springs against turning movement about the axle, and means extending through the harp and said axle connecting the reservoirs with the harp and securing the parts in assembled relation.

12. A trolley including a wheel, a harp straddling the wheel, freely removable reservoirs interposed between the wheel and harp and being separate therefrom, the reservoirs being interchangeable, and fastening means extending through the harp, the reservoirs and the wheel connecting the reservoirs with the harp and constituting the sole fastening medium securing the parts in assembled relation.

In testimony whereof we affix our signatures.

MITCHELL W. THOMAS. [L. S.]
JOHN L. FEARING. [L. S.]